Figure 1:
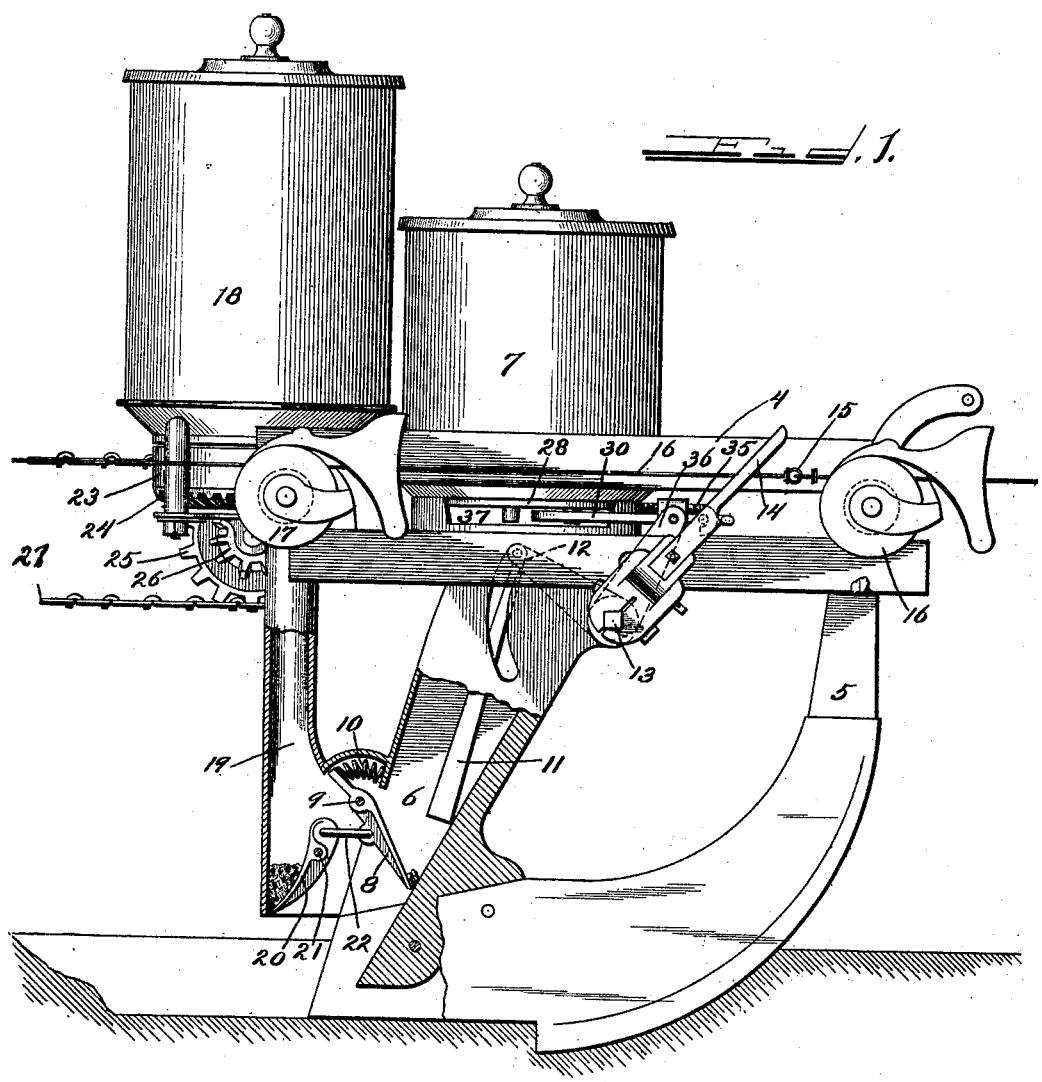

No. 693,584. Patented Feb. 18, 1902.
W. T. M. BRUNNEMER.
SEEDING MACHINE.
(Application filed June 9, 1900.)

(No Model.) 2 Sheets—Sheet 1.

No. 693,584. Patented Feb. 18, 1902.
W. T. M. BRUNNEMER.
SEEDING MACHINE.
(Application filed June 9, 1900.)
(No Model.) 2 Sheets—Sheet 2.
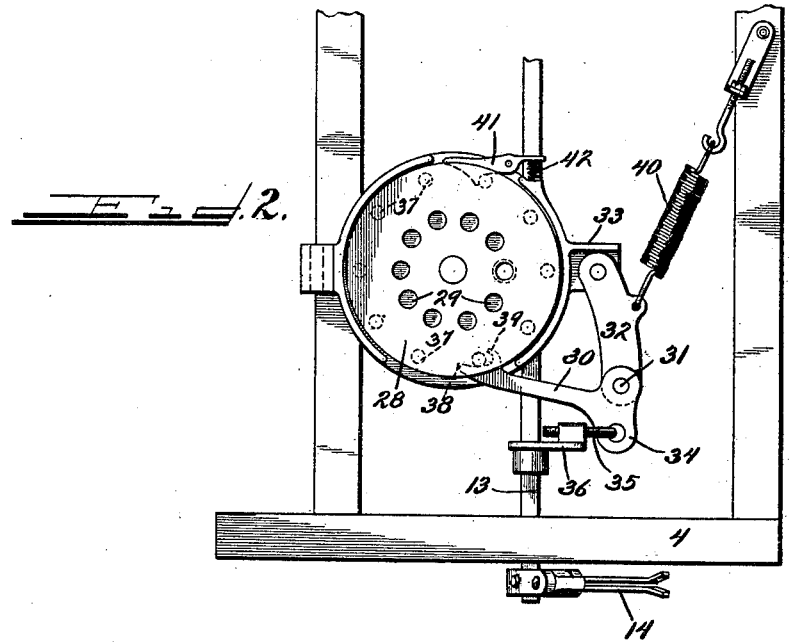
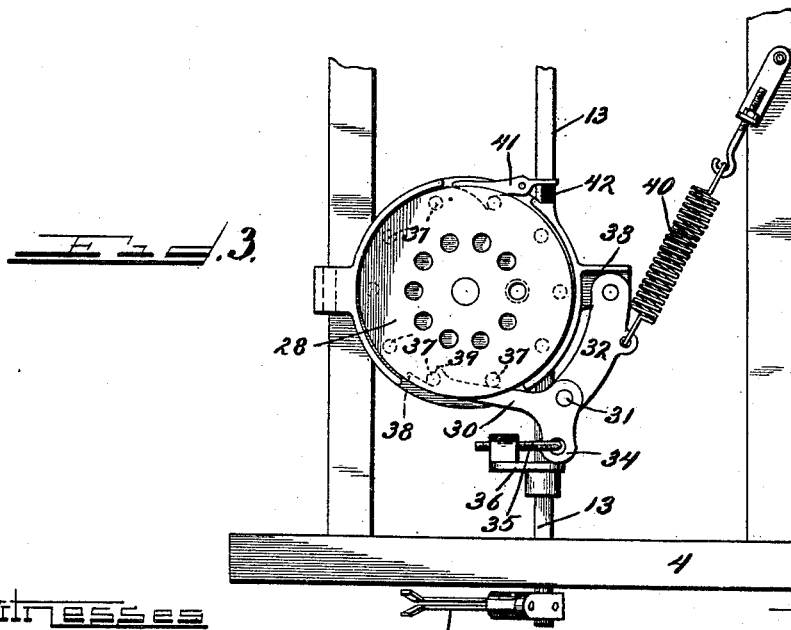
WITNESSES
S. B. Weir.
Ira D. Perry.
INVENTOR
William T. M. Brunnemer,
by Bond Adams Pickard Jackson.
his Atty's
THE NORRIS PETERS CO., PHOTO-LITHO., WASHINGTON, D. C.

UNITED STATES PATENT OFFICE.

WILLIAM T. M. BRUNNEMER, OF BRADLEY, ILLINOIS, ASSIGNOR TO THE DAVID BRADLEY MANUFACTURING COMPANY, OF CHICAGO, ILLINOIS, A CORPORATION OF ILLINOIS.

SEEDING-MACHINE.

SPECIFICATION forming part of Letters Patent No. 693,584, dated February 18, 1902.

Application filed June 9, 1900. Serial No. 19,762. (No model.)

*To all whom it may concern:*

Be it known that I, WILLIAM T. M. BRUNNEMER, a citizen of the United States, residing at Bradley, in the county of Kankakee and State of Illinois, have invented certain new and useful Improvements in Seeding-Machines, of which the following is a specification, reference being had to the accompanying drawings.

My invention relates to seeding-machines, and has more particularly to do with check-row corn-planters, although my invention includes the application of the improvements described to other machines.

My invention consists in improved mechanism for applying fertilizer to the soil at the time the seed is planted, and more specifically in operating the fertilizer-applying mechanism in conjunction with the seed-dropping devices.

It further consists in improved feeding mechanism operated by the usual check-row wire, said feeding devices being arranged to insure the proper feeding of the seed to the seed-tubes.

What I regard as new will be set forth in the claims.

Referring to the drawings, Figure 1 is an end elevation, some of the parts being in section; and Figs. 2 and 3 are plan views, the seedboxes being removed, illustrating the seed-dropping devices in different positions.

In the drawings, 4 indicates the front or runner frame of a seeding-machine provided with the usual runners 5 or other furrow-opening devices.

6 indicates one of the usual seed-tubes arranged to receive the seed from the seedbox 7 and deliver it to the furrow back of the furrow-opener 5. The seed-tube 6 is provided with a check-valve 8, mounted on a pivot 9 and extending across the seed-tube, closing the passage thereof, as shown in Fig. 1. A spring 10 normally holds the valve 8 in closed position.

11 indicates a plunger arranged in the seed-tube 6 and pivoted at its upper end to an arm 12, mounted upon a rock-shaft 13, which is supported in the frame 4 and extends transversely thereof in the usual way. The rock-shaft 13 carries at its ends the usual forks 14, which engage the knots 15 of the check-row wire 16 in the usual way. By this construction as the rock-shaft 13 is rocked by the operation of the check-row wire the plunger 11 reciprocates in the seed-tube 6, its downward movement opening the valve 8 and discharging the seed in the tube on the ground.

The construction thus far described is not new and is not herein claimed.

16 17 indicate the usual guides for a check-row wire.

18 indicates a fertilizer-box arranged in the frame 4 back of the seedbox 7, as shown in Fig. 1. Said fertilizer-box is provided with a fertilizer-tube 19, which extends therefrom down back of the seed-tube 6 and terminates near the ground, as shown. The fertilizer-tube 19 is provided with a valve 20, mounted on a pivot 21, as shown in Fig. 1. Said valve is normally held in position to close the passage in the tube 19 by a link 22, which connects said valve 20 above its pivot with the valve 8 below the pivot of the latter. The spring 10, which holds the valve 8 in position to close the seed-tube, also holds the valve 20 in position to close the fertilizer-tube 19. When, however, the valve 8 is rocked to open the seed-passage, the valve 20 is also rocked automatically to open the passage in the fertilizer-tube, the fertilizer being therefore applied to the soil with the seed. Suitable valve mechanism is provided in the bottom of the fertilizer-box 18 for feeding the proper amount of fertilizer to the fertilizer-tube at suitable intervals. In the drawings I have illustrated such feeding mechanism as consisting of a disk valve 23, provided with a beveled gear 24, operating from a sprocket-wheel 25 by a pinion 26, the sprocket-wheel being driven by a chain 27, in turn driven from the carrying-wheels of the machine, the latter not being shown. The fertilizer-feeding mechanism may, however, be operated by the check-row wire or may be of any other approved construction.

The specific mechanism for feeding fertilizer to the fertilizer-tube not being a part of my present invention is not illustrated in detail, and I wish it to be understood that any of the well-known feeding devices may be employed, my present invention, so far as the fertilizer-supplying mechanism is concerned, being limited to the operation of the fertilizer-supplying devices in conjunction with the seed-feeding mechanism, so that the fertilizer is supplied to the seed as it is dropped, and, secondly, to the automatic operation of such fertilizer-supplying mechanism by the operation of the valve in the seed-tube.

The feeding devices for feeding the seed in the seedbox to the seed-tube are best shown in Figs. 2 and 3. As is illustrated therein, in the bottom of the seedbox is provided a seed-disk valve 28, which is adapted to rotate therein in a horizontal plane and is provided with a series of holes 29, through which the seed passes from the seedbox to the seed-tube 6. Each of said holes 29 is of the proper size to contain the number of seeds which it is desired to plant in each hill, and such number of seeds are fed to the seed-tube as each hole comes into alinement with the upper end of the seed-tube in the usual and well-known way. The seed-disk 28 is rotated by means of a pawl 30, pivoted by a pivot 31 to an arm 32, pivotally mounted on a suitable support 33. Said pawl 30 is provided with an arm 34, which is connected by a link 35 with an arm 36, secured to the rock-shaft 13, as shown in Fig. 2. The arm 34 is arranged opposite the pivot 31 and projects toward the fork 14, so that when the rock-shaft 13 is rocked by the operation of the check-row wire the link 35 pulls back on the arm 34 and throws the rear end of the pawl 30 inward toward the seed-disk 28. The pawl 30 is arranged slightly below the seed-disk 28 and projects under it, as shown in Fig. 2, so that it is adapted to engage a series of pins 37, carried by and projecting downward from the seed-disk 28, one of said pins being provided for each of the holes 29. The inner end of the pawl 30 is provided with fingers 38 39, forming a fork or socket adapted to receive the pins 37, as shown. The outer finger 38 is somewhat longer than the inner finger 39.

40 indicates a spring adjustably secured to the frame 4 and secured also to the arm 32. Said spring exerts a forward pull on the arm 32 and serves to draw the pawl 30 forward after each operation. The pawl 30 is so arranged with reference to the seed-disk 28 that when it moves far enough to carry the seed-disk 28 around so as to bring the next hole 29 into position over the seed-tube the intermediate portion of said pawl will bear against the next pin 37, as shown in Fig. 3. Inasmuch as the fingers 38 39 will at such time engage the next pin to the rear, as shown in Fig. 3, the finger 39 preventing outward movement of the pawl, said pawl, together with the pins 37 engaged by it, will lock the seed-disk valve and prevent it from moving beyond the proper point. It will thus be seen that an automatic lock is provided which prevents excessive movement of the seed-disk and insures the registration of the holes 29 with the seed-tube. As soon as the fork 14 is released from the knot on the check-row wire the shaft 13 will rock forward under the action of the spring 40, the arm 32 being carried forward and carrying with it the pawl 30. The swinging of the arm 32 about its pivot will automatically carry the pivot 31 of the pawl forward faster than the arm 36 and will consequently rock said pawl about its pivot 31, throwing its rear end inward and insuring the proper engagement of said pawl with the next pin 37. To prevent reverse rotation of the seed-disk 28, a detent 41 is provided, which engages the pins 37 successively, as shown in Fig. 2, said detent being normally held in operative position by a spring 42, as shown in Figs. 2 and 3.

Instead of arranging the pawl 30 so that the locking is effected by the engagement of the intermediate portion thereof with one of the pins 37 some other device may be provided, so arranged as to engage the intermediate portion of the pawl when moved to the proper point—such, for example, as a fixed pin on the seedbox. I therefore do not wish to be limited to the specific arrangements shown except in so far they are specifically claimed.

That which I claim as my invention, and desire to secure by Letters Patent, is—

1. In a seeding-machine, the combination of a seed-tube, a fertilizer-tube, a spring-controlled pivoted check-valve in said seed-tube, a pivoted check-valve in said fertilizer-tube, a link connecting said valves, and a reciprocating plunger adapted to engage one of said valves to operate the same and thereby simultaneously operate the other of said valves.

2. In a seeding-machine, the combination of a seed-tube, a fertilizer-tube, a pivoted check-valve in said seed-tube, a pivoted check-valve in said fertilizer-tube, a spring bearing upon the upper end of one of said valves to hold the same normally closed, a link connected to such valve intermediate its ends and to the upper end of the other valve, and a reciprocating plunger adapted to engage one of said valves to operate the same and thereby simultaneously operate the other of said valves.

3. In a seeding-machine, the combination of a seed-tube, a fertilizer-tube, a spring-controlled pivoted check-valve in said seed-tube, a check-valve in the fertilizer-tube, a link connecting said valves, a check-rower attachment and a plunger operated thereby and adapted to engage said valve in the seed-tube to open the same and thereby simultaneously open the valve in the fertilizer-tube.

4. In a seeding-machine, the combination of a seedbox, a rotary valve, a pivotally-mounted traveling pawl, and a rock-shaft directly connected with said pawl, said pawl being adapted to engage said valve for rotating the same.

5. In a seeding-machine, the combination of a seedbox, a rotary valve, a swinging arm, a pawl pivoted to said arm, and a rock-shaft directly connected with said pawl, said pawl being adapted to engage said valve for rotating the same.

6. In a seeding-machine, the combination of a seedbox, a rotary valve, a swinging arm, a pivoted pawl carried by said arm, means connected with said pawl for swinging said arm toward the valve, and means for retracting said arm, said pawl being adapted to engage said valve for rotating the same.

7. In a seeding-machine, the combination of a seedbox, a rotary valve, a pivoted arm, a spring connected with said arm and with the frame of the machine, a pawl pivoted to said arm, and a rock-shaft directly connected with said pawl, said pawl being adapted to engage said valve for rotating the same.

8. In a seeding-machine, the combination of a seedbox, a rotary valve, an arm 32, a pawl pivoted to said arm, a rock-shaft having an arm 36, said pawl 30 having an arm 34, a connecting device connecting said arms 34 and 36, said pawl being adapted to engage pins carried by said valve for rotating the same, and a spring 40 connected with said arm 32 and with the frame of the machine, substantially as described.

9. In a seeding-machine, the combination of a machine-frame, a seedbox, a rotary disk valve supported in said seedbox, said valve having a number of perforations 29 adapted to register with a seed-tube, pins 37 projecting from said valve, a detent 41 adapted to engage said pins to prevent reverse movement of said valve, a rock-shaft 13 having an arm 36, an arm 32 pivoted at one end to a suitable support, a spring 40 connected to the frame of the machine and to said arm 32, and a pawl 30 pivoted to said arm 32 and having an arm 34 connected with said arm 36, said pawl 30 having a fork at its free end, said fork being adapted to receive the pins 37, substantially as described.

WILLIAM T. M. BRUNNEMER.

Witnesses:
E. S. TROUGHTON,
F. W. BICKNELL.